United States Patent
Yang et al.

(10) Patent No.: US 12,165,329 B2
(45) Date of Patent: Dec. 10, 2024

(54) SYSTEM AND METHOD FOR UNSUPERVISED SUPERPIXEL-DRIVEN INSTANCE SEGMENTATION OF REMOTE SENSING IMAGE

(71) Applicant: PING AN TECHNOLOGY (SHENZHEN) CO., LTD., Shenzhen (CN)

(72) Inventors: Zhicheng Yang, Fremont, CA (US); Hang Zhou, Santa Clara, CA (US); Jui-Hsin Lai, Santa Clara, CA (US); Mei Han, Palo Alto, CA (US)

(73) Assignee: PING AN TECHNOLOGY (SHENZHEN) CO., LTD, Shenzhen (CN)

( * ) Notice: Subject to any disclaimer, the term of this patent is extended or adjusted under 35 U.S.C. 154(b) by 417 days.

(21) Appl. No.: 17/667,523

(22) Filed: Feb. 8, 2022

(65) Prior Publication Data
US 2023/0252644 A1    Aug. 10, 2023

(51) Int. Cl.
G06T 7/136    (2017.01)

(52) U.S. Cl.
CPC .... G06T 7/136 (2017.01); *G06T 2207/20072* (2013.01); *G06T 2207/20081* (2013.01)

(58) Field of Classification Search
CPC ........... G06T 7/136; G06T 2207/20072; G06T 2207/20081; G06T 7/11; G06T 7/162; G06T 7/187; G06N 3/088
See application file for complete search history.

(56) References Cited

U.S. PATENT DOCUMENTS

| | | | |
|---|---|---|---|
| 11,868,442 B2* | 1/2024 | Sawal | G06N 3/045 |
| 2019/0171908 A1* | 6/2019 | Salavon | G06V 10/82 |
| 2020/0320293 A1* | 10/2020 | Yang | G06V 20/17 |
| 2022/0303288 A1* | 9/2022 | Wang | H04L 63/1433 |

OTHER PUBLICATIONS

Guohao Li et al., DeepGCNs: Can GCNs Go as Deep as CNNs?, arXiv: 1904.03751v2 [cs.CV], Aug. 19, 2019, 17 pages (Year: 2019).*
Azade Nazi et al., GAP: Generalizable Approximate Graph Partitioning Framework, Mar. 2, 2019 (Year: 2019).*
Guohao Li et al., DeepGCNs: Can GCNs Go as Deep as CNNs?, arXiv: 1904.03751v2 [cs.CV], Aug. 19, 2019, 17 pages.
Azade Nazi et al., GAP: Generalizable Approximate Graph Partitioning Framework, arXiv: 1903.00614v1 [cs.LG], Mar. 2, 2019, 13 pages.
Fulin Huang et al., Unsupervised Superpixel-Driven Parcel Segmentation of Remote Sensing Images Using Graph Convolutional Network.

* cited by examiner

*Primary Examiner* — Ross Varndell
*Assistant Examiner* — Dustin Bilodeau
(74) *Attorney, Agent, or Firm* — BAYES PLLC

(57) ABSTRACT

A system and method for unsupervised superpixel-driven instance segmentation of a remote sensing image are provided. The remote sensing image is divided into one or more image patches. The one or more image patches are processed to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The one or more superpixel aggregation patches are combined into an instance segmentation image.

20 Claims, 9 Drawing Sheets

Table 1

| Method | County | | | |
|---|---|---|---|---|
| | Fuyu | Yuanyang | Caoxian | Xiangzhou |
| DIC | 0.7071 | 0.6381 | 0.6238 | 0.6013 |
| UISB | 0.7784 | 0.7522 | 0.7344 | 0.6890 |
| GAP | 0.8509 | 0.8056 | 0.8022 | 0.7560 |
| Graph-based Aggregation Model | 0.8826 | 0.8439 | 0.8415 | 0.8137 |

FIG. 9A

Table 2

| $\sigma$ | $\delta$ | | | |
|---|---|---|---|---|
| | 0 | 0.3 | 0.7 | 1 |
| 0.1 | 0.6817 | 0.7608 | 0.8121 | 0.7872 |
| 1 | 0.8203 | 0.8328 | 0.8439 | 0.8374 |
| 10 | 0.8100 | 0.8125 | 0.8138 | 0.8126 |

FIG. 9B

Table 3

| Quarter | Fuyu | Yuanyang | Caoxian | Xiangzhou |
|---|---|---|---|---|
| First | 0.8847 | 0.8472 | 0.8448 | 0.8062 |
| Second | 0.8816 | 0.8497 | 0.8435 | 0.8104 |
| Third | 0.8803 | 0.8415 | 0.8406 | 0.8225 |
| Fourth | 0.8837 | 0.8373 | 0.8371 | 0.8157 |

FIG. 9C

SYSTEM AND METHOD FOR UNSUPERVISED SUPERPIXEL-DRIVEN INSTANCE SEGMENTATION OF REMOTE SENSING IMAGE

TECHNICAL FIELD

The present disclosure relates to image processing, and more particularly, to a system and method for performing unsupervised superpixel-driven instance segmentation on a remote sensing image.

BACKGROUND

An agricultural parcel refers to a parcel of land where the primary and dominant use is agriculture. For example, an agricultural parcel includes a continuous area of land, declared by one farmer, which does not cover more than one single crop group. Parcel segmentation of a remote sensing image includes segmenting the remote sensing image into a plurality of agricultural parcels. Accurate parcel segmentation of remote sensing images plays an important role in ensuring various downstream tasks. For example, parcel segmentation is a building block of many environmental remote sensing applications, such as crop classification, crop growth monitoring, land use change detection, etc. These applications inform governance and business decisions related to food security, climate change, and environmental protection.

Traditionally, parcel segmentation is based on supervised learning using precise parcel-level ground truth information, which is difficult to obtain. For example, a vast majority of existing parcel segmentation tasks are based on supervised learning methods, which require precise parcel-level ground truth annotation in a target area. This requirement has almost become indispensable in the era of deep learning in existing technologies. While satellite images provide a wealth of spatial, temporal, and spectral information of the earth surface, annotating parcel-level reference is time-consuming and labor-intensive. As a result, existing supervised learning-based algorithms suffer from unsatisfactory generalization in other regions. Some existing datasets are constructed by per-pixel classification, which have salt-and-pepper noise, leading to an obstruction of their usability.

SUMMARY

In one aspect, a method for unsupervised superpixel-driven instance segmentation of a remote sensing image is disclosed. The remote sensing image is divided into one or more image patches. The one or more image patches are processed to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The one or more superpixel aggregation patches are combined into an instance segmentation image.

In another aspect, a system for unsupervised superpixel-driven instance segmentation of a remote sensing image is disclosed. The system includes a memory configured to store instructions and a processor coupled to the memory. The processor is configured to execute the instructions to perform a process. The process includes dividing the remote sensing image into one or more image patches. The process further includes processing the one or more image patches to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The process also includes combining the one or more superpixel aggregation patches into an instance segmentation image.

In yet another aspect, a non-transitory computer-readable storage medium is disclosed. The non-transitory computer-readable storage medium is configured to store instructions which, in response to an execution by a processor, cause the processor to perform a process. The process includes dividing the remote sensing image into one or more image patches. The process further includes processing the one or more image patches to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The process also includes combining the one or more superpixel aggregation patches into an instance segmentation image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

FIG. 9A is a graphical representation illustrating average probabilistic rand index (PRI) values of instance segmentation results using various existing models and a graph-based aggregation model described herein, according to embodiments of the disclosure.

FIG. 9B is a graphical representation illustrating average PRI values of a graph-based aggregation model with various combinations of parameter values, according to embodiments of the disclosure.

FIG. 9C is a graphical representation illustrating overall robustness of a graph-based aggregation model across different seasons, according to embodiments of the disclosure.

Figure 1:
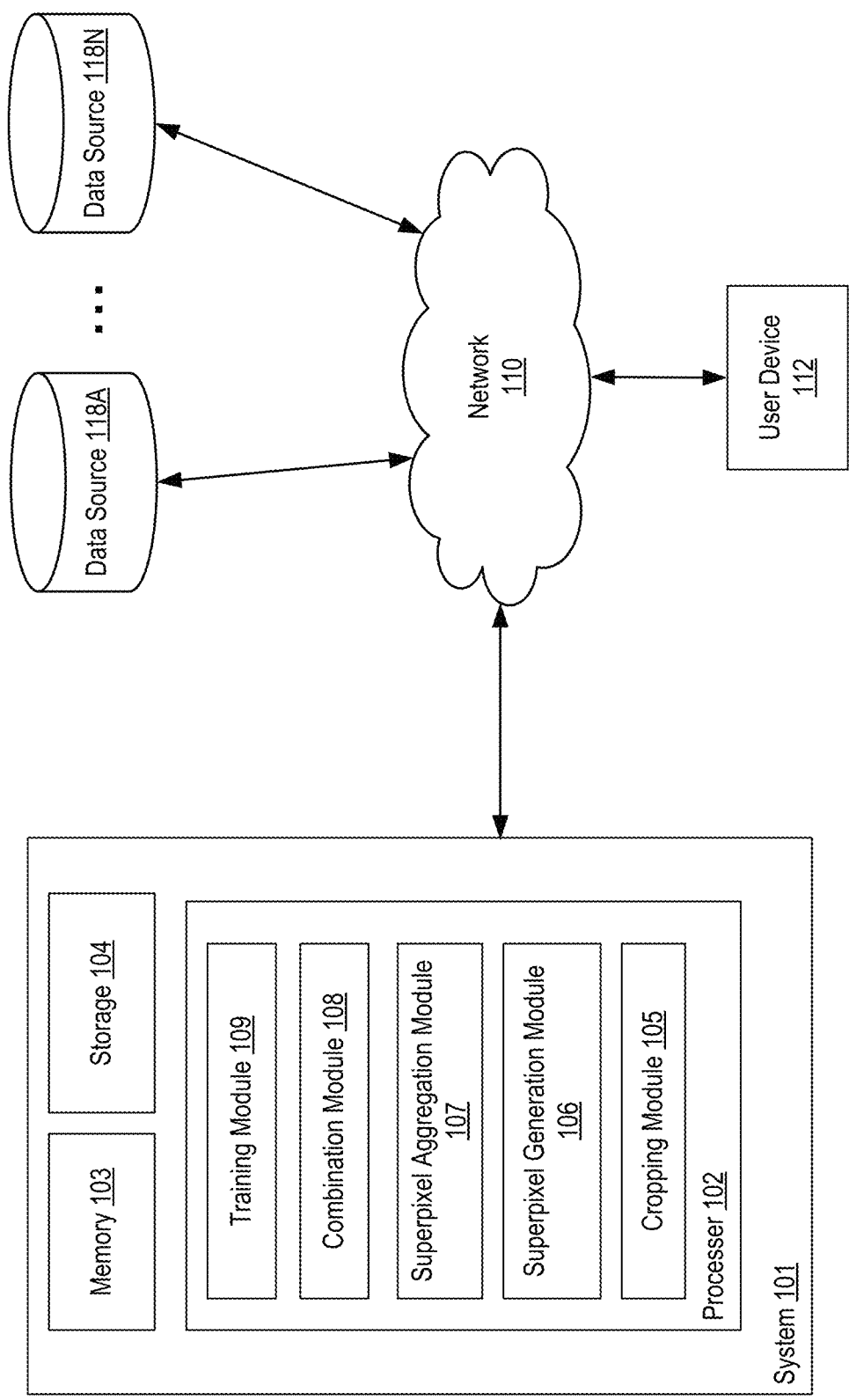
FIG. 1 illustrates a block diagram of an exemplary operating environment for a system configured to perform unsupervised superpixel-driven instance segmentation on a remote sensing image, according to embodiments of the disclosure.

Implementations of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Unlike supervised learning-based segmentation methods that require ground truth training data, unsupervised learning-based segmentation methods do not need the expensive ground truth information during the learning process. These unsupervised methods rely on image content to accomplish a segmentation task, leading to much better generalization capacity when compared with the supervised methods.

In some applications, superpixels are used in remote sensing segmentation tasks, with each superpixel representing a group of pixels that share similar properties. For example, a superpixel may include a group of pixels that share similar feature properties such as similar colors (e.g., a feature difference among the group of pixels within the superpixel is not greater than a predetermined threshold). A superpixel-level result can facilitate image processing and significantly eliminate the salt-and-pepper noise. With the vigorous development of deep learning nowadays, a superpixel output is commonly used as an intermediate result or guidance to achieve better performance in supervised learning-based segmentation tasks in remote sensing.

Recently, Graph Convolutional Networks (GCNs) have empowered numerous applications in recommendation systems, computer vision, and natural language processing. For example, graph partitioning aims to divide a vertex set under constraints, such that the edge cut across the partitions is minimized. Since a superpixel can be transformed into a node in a graph, it is possible to leverage GCNs to learn the latent relationship among superpixels and partition them into a few larger segments without ground truth training data. These larger segments, which are the aggregations of the superpixels, are visually a segmentation result of the image.

Conventional unsupervised learning algorithms for superpixel aggregation are mainly based on the idea of normalized cut on a graph, which calculates the cut cost as a fraction of all nodes' edge connections, and further based on a bipartite graph. However, these traditional methods suffer from heavy computational complexity when the number of superpixels increases, which are not feasible for large-scale model deployments.

Many deep learning-based approaches incorporate superpixels in their proposed frameworks. An affinity loss is designed to improve the superpixel segmentation, which is also adopted in remote sensing tasks. Nevertheless, the objectives of these usages are to either enhance the generation of superpixel itself or further boost the entire supervised learning tasks. Recently, some superpixel-guided unsupervised frameworks are proposed for image segmentation such as Unsupervised Image Segmentation by Backpropagation (UISB) and Deep Image Clustering (DIC). They utilize Convolutional Neural Networks (CNNs) to generate a superpixel segmentation result, but fail to utilize the spatial affinity among the superpixels to improve the superpixel segmentation result. Also, an unsupervised GCN-based graph partitioning framework such as Generalizable Approximate Graph (GAP) is presented. However, the usability of GAP for image segmentation tasks is not well studied yet.

In this disclosure, a system and a method for performing unsupervised superpixel-driven instance segmentation on a remote sensing image are provided. Specifically, an end-to-end unsupervised GCN-based framework for superpixel-driven instance segmentation (e.g., parcel segmentation) of remote sensing images is provided. The unsupervised GCN-based framework incorporates the graph-learning capacity of GCNs and the generalization of superpixels. The unsupervised GCN-based framework may include a graph-based aggregation model configured to aggregate the superpixels. Unlike any existing GCN-based model, the graph-based aggregation model described herein has a modified network structure and a modified loss function. The graph-based aggregation model described herein can effectively learn the latent affinity relationship among the superpixels and aggregate similar superpixels in spatial and feature spaces based on the learned affinity relationship.

Consistent with the present disclosure, a multi-temporal multi-location testing dataset using Sentinel-2 images is constructed. Ground truth annotations of the images in various regions are also constructed. Extensive experiments are conducted to demonstrate the efficacy and robustness of the graph-based aggregation model described herein (as illustrated below in more detail with reference to FIGS. 7-9C).

Consistent with the present disclosure, the unsupervised GCN-based framework (including the graph-based aggregation model) described herein can be used for any type of instance segmentation of remote sensing images, such as parcel segmentation of remote sensing images in agricultural applications, instance segmentation of remote sensing images in plain areas, hilly areas, or urban areas, etc. Consistent with the present disclosure, a feature space of superpixels described herein may include a spectral space (e.g., a color space) or any other suitable feature space.

FIG. 1 illustrates an exemplary operating environment 100 for a system 101 configured to perform unsupervised superpixel-driven instance segmentation on a remote sensing image, according to embodiments of the disclosure. Operating environment 100 may include system 101, one or more data sources 118A, . . . , 118N (also referred to as data source 118 herein, individually or collectively), a user device 112, and any other suitable components. Components of operating environment 100 may be coupled to each other through a network 110.

In some embodiments, system 101 may be embodied on a computing device. The computing device can be, for example, a server, a desktop computer, a laptop computer, a tablet computer, or any other suitable electronic device including a processor and a memory. In some embodiments, system 101 may include a processor 102, a memory 103, and a storage 104. It is understood that system 101 may also include any other suitable components for performing functions described herein.

In some embodiments, system 101 may have different components in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location or distributed locations. In some embodiments, components of system 101 may be in an integrated device or distributed at different locations but communicate with each other through network 110.

Processor 102 may include any appropriate type of general-purpose or special-purpose microprocessor, digital signal processor, microcontroller, and graphics processing unit (GPU). Processor 102 may include one or more hardware units (e.g., portion(s) of an integrated circuit) designed for use with other components or to execute part of a program. The program may be stored on a computer-readable medium, and when executed by processor 102, it may perform one or more functions disclosed herein. Processor 102 may be configured as a separate processor module dedicated to image processing. Alternatively, processor 102 may be configured as a shared processor module for performing other functions unrelated to image processing.

As shown in FIG. 1, processor 102 may include components for performing two phases, e.g., a training phase for training a graph-based aggregation model and an aggregation phase for performing a superpixel aggregation process using the graph-based aggregation model. To perform the training phase, processor 102 may include a training module 109 or any other suitable component for performing the training function (e.g., a training database). To perform the aggregation phase, processor 102 may include a cropping module 105, a superpixel generation module 106, a superpixel aggregation module 107, and a combination module 108. In some embodiments, processor 102 may include more or less of the components shown in FIG. 1. For example, when a graph-based aggregation model for superpixel aggregation is pre-trained and provided, processor 102 may only include modules 105-108 (without training module 109).

Although FIG. 1 shows that cropping module 105, superpixel generation module 106, superpixel aggregation module 107, combination module 108, and training module 109 are within one processor 102, they may also be implemented on different processors located closely or remotely with each other. For example, training module 109 may be implemented by a processor (e.g., a GPU) dedicated to off-line training, and other modules 105-108 may be implemented by another processor for performing unsupervised superpixel-driven instance segmentation on remote sensing images.

Cropping module 105, superpixel generation module 106, superpixel aggregation module 107, combination module 108, and training module 109 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions described herein. Cropping module 105, superpixel generation module 106, superpixel aggregation module 107, combination module 108, and training module 109 are described below in more detail with reference to FIGS. 2-6.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform instance segmentation on remote sensing images. Memory 103 and/or storage 104 may be further configured to store information and data used by processor 102.

Each data source 118 may include one or more storage devices configured to store remote sensing images. The remote sensing images can be captured by cameras installed in satellites, manned or unmanned aircrafts such as unmanned aerial vehicles (UAVs), hot balloons, etc. For example, data source 118 may be a National Agriculture Imagery Program (NAIP) data source and may store remote sensing images with a resolution of 0.6 meters. In another example, data source 118 may be a Sentinel-2 data source and may store remote sensing images with a resolution of 10 meters. The remote sensing images from the Sentinel-2 data source can be referred to as Sentinel-2 images. Although FIG. 1 illustrates that system 101 and data source 118 are separate from each other, in some embodiments data source 118 and system 101 can be integrated into a single device.

User device 112 can be a computing device including a processor and a memory. For example, user device 112 can be a desktop computer, a laptop computer, a tablet computer, a smartphone, a game controller, a television (TV) set, a music player, a wearable electronic device such as a smart watch, an Internet-of-Things (IoT) appliance, a smart vehicle, or any other suitable electronic device with a processor and a memory. Although FIG. 1 illustrates that system 101 and user device 112 are separate from each other, in some embodiments user device 112 and system 101 can be integrated into a single device.

In some embodiments, a user may operate on user device 112 and may provide a user input through user device 112. User device 112 may send the user input to system 101 through network 110. The user input may include one or more parameters for performing instance segmentation on a remote sensing image. For example, the one or more parameters may include one or more of a location (or a geographical region) of interest, a specified time (or a specified time window) when the remote sensing image is acquired, a size of each image patch to be cropped from the remote sensing image, etc. The location can be a geographical location or a surface location on Earth. For example, the location can include a longitude and a latitude, an address (e.g., a street, city, state, country, etc.), a place of interest, etc.

Figure 2:
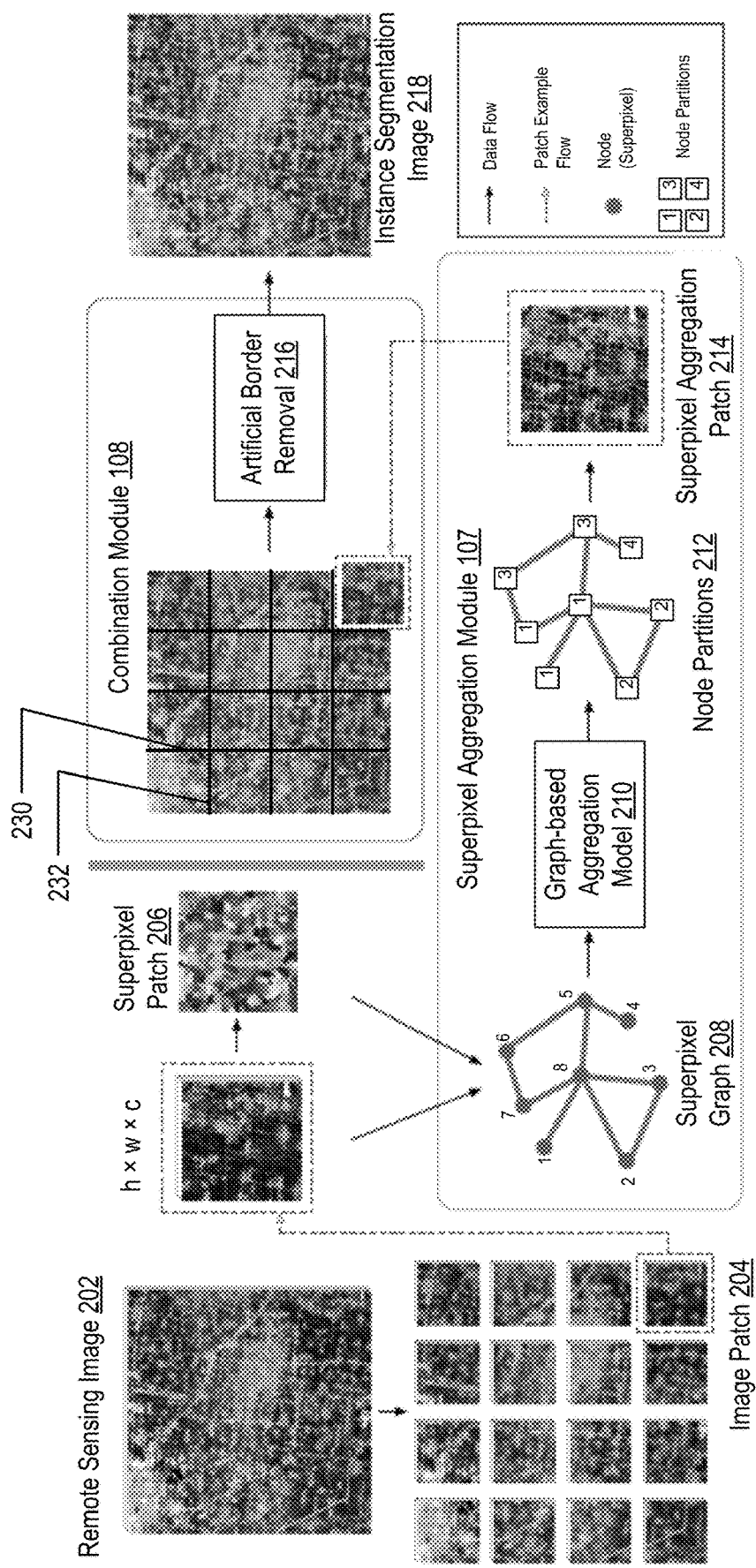
FIG. 2 is a graphical representation illustrating an exemplary flow of operations for performing unsupervised superpixel-driven instance segmentation on a remote sensing image, according to embodiments of the disclosure.

FIG. 2 is a graphical representation illustrating an exemplary flow 200 of operations for performing unsupervised superpixel-driven instance segmentation on a remote sensing image, according to embodiments of the disclosure. An overview of flow 200 is provided herein. A remote sensing image 202 may be first cropped into one or more smaller image patches 204 for efficient processing. For each image patch 204, superpixel generation may then be performed on image patch 204 to generate a superpixel patch 206. Image patch 204 and its superpixel patch 206 may be used together to construct a superpixel graph 208 that is fed into a graph-based aggregation model 210. As a result, graph-based aggregation model 210 learns superpixel graph 208 and generates node partitions 212 for superpixel graph 208. The partitioning of superpixel graph 208 is equivalent to the superpixel aggregation of image patch 204, and a superpixel aggregation patch 214 can be generated for image patch 204.

By performing similar operations, one or more superpixel aggregation patches 214 can be generated for one or more image patches 204 cropped from remote sensing image 202, respectively. Next, the one or more superpixel aggregation patches 214 can be stitched together to generate an instance segmentation image 218. An artificial border removal procedure 216 may be performed to eliminate fake resultant boundaries at borders of superpixel aggregation patches 214.

Instance segmentation image 218 may be an instance segmentation result for the entire remote sensing image 202. By performing flow 200 of operations, instance segmentation is achieved on remote sensing image 202, such that superpixels without semantic information can be partitioned into one or more instances with semantic information. For example, the instance segmentation result can be a parcel segmentation result, and the superpixels can be aggregated (or partitioned) into agricultural parcels.

Detailed description for flow 200 of operations is provided below. Initially, cropping module 105 may receive remote sensing image 202 from data source 118. Remote sensing image 202 can be a Sentinel-2 image or any other suitable remote sensing image to be processed. Cropping module 105 may divide remote sensing image 202 into one or more image patches 204. Each image patch 204 may have multi-spectral channels including, e.g., a red band, a green band, a blue band, a near-infrared band, etc.

For example, a single Sentinel-2 image has 10,980×10,980 pixels, and it is rare to directly process it on a deep learning model due to hardware limitation and expensive computational overhead. Instead, the Sentinel-2 image can be cropped into smaller image patches, with each cropped image patch has a size of hxwxc, where h, w, and c are positive integers, h denotes a first dimension representing the height of the image patch, w denotes a second dimension representing the width of the image patch, and c denotes a third dimension representing a total number of spectral channels (e.g., c=4 with 4 spectral channels such as blue, green, red, and near-infrared bands (BGRN)).

In another example, multi-temporal remote sensing images associated with the same geographical location of interest can be retrieved from data source 118. The multi-temporal remote sensing images may include T remote sensing images that capture a scene of interest at different times, with T being a positive integer. In some embodiments, the multi-temporal remote sensing images may be obtained from a video. Cropping module 105 may combine the multi-temporal remote sensing images together and crop the combined multi-temporal remote sensing images into smaller image patches. For example, each cropped image patch may have a size of hxwx (CT), where the product of c and T (e.g., cT) denotes the third dimension representing a total number of channel samples for the c spectral channels. Alternatively, each cropped image patch may have a size of hxwxcxT, with T denoting a fourth dimension representing the number of multi-temporal remote sensing images.

Next, for each image patch 204, superpixel generation module 106 may process image patch 204 to generate a superpixel patch 206. Superpixel patch 206 may include a plurality of superpixels. In some embodiments, superpixel generation module 106 may cluster pixels from image patch 204 to generate the plurality of superpixels of superpixel patch 206. For example, superpixel generation module 106 may adopt a Simple Non-Iterative Clustering (SNIC) algorithm to generate superpixel patch 206 from image patch 204 due to overall satisfaction of the SNIC algorithm in terms of visual quality and compactness.

Superpixel aggregation module 107 may generate superpixel aggregation patch 214 based on superpixel patch 206 and image patch 204, as described below in more detail. For example, superpixel aggregation module 107 may apply graph-based aggregation model 210 to image patch 204 and the plurality of superpixels from superpixel patch 206 to generate superpixel aggregation patch 214. In this case, graph-based aggregation model 210 may be configured to learn a spatial affinity, a feature affinity, or both, of the plurality of superpixels. Graph-based aggregation model 210 may aggregate the plurality of superpixels to generate one or more node partitions 212 for superpixel aggregation patch 214 based on the spatial affinity and/or the feature affinity of the plurality of superpixels. Graph-based aggregation model 210 is described below in more detail with reference to FIGS. 3-4.

In some embodiments, superpixel aggregation module 107 may construct superpixel graph 208 based on image patch 204 and the plurality of superpixels from superpixel patch 206. Superpixel graph 208 may include a plurality of nodes, with each node representing a corresponding superpixel from the plurality of superpixels (thus, a node can also be referred to as a superpixel node herein). A connection (e.g., an edge) between two nodes in superpixel graph 208 may be determined based on spatial locations and features (e.g., spectral features such as colors) of the two nodes. For example, if the two connected nodes are spatially close to each other (e.g., adjacent to one another) and have similar colors, a distance between the two connected nodes (e.g., an edge length of the two connected nodes) may be smaller than that of two other connected nodes that are not spatially close and/or have different colors. In other words, the edges in superpixel graph 208 can be varied (not fixed). The relationship of a superpixel node and its neighbors can be dynamically learned during training.

In some embodiments, superpixel aggregation module 107 may generate a superpixel node input corresponding to superpixel graph 208. The superpixel node input may include at least one of an adjacency matrix, multi-dimensional node features of each node, or a node degree of superpixel graph 208. For example, superpixel aggregation module 107 may construct an adjacency matrix indicating a degree of adjacency among the plurality of nodes within at least one of a spatial space or a feature space. The adjacency matrix is described below in more detail with reference to FIGS. 3-4.

In another example, superpixel aggregation module 107 may determine a node degree of superpixel graph 208. The node degree of superpixel graph 208 may represent a total number of nodes (denoted as "n") in superpixel graph 208, which is also equal to a total number of superpixels in superpixel patch 206. The node degree of superpixel graph 208 may be expressed using a vector such as n×1.

In yet another example, superpixel aggregation module 107 may determine multi-dimensional node features of each node based on multi-spectral values of pixels in a superpixel corresponding to the node. By using c spectral channels (e.g., c=4), the mean spectral values (e.g., the mean BGRN values) of all pixels inside the superpixel contribute to c-dimensional (e.g., 4-dimensional) node features of the node, respectively. For example, when c=4, the 4-dimensional node features of the node may include a first node feature, a second node feature, a third node feature, and a fourth node feature. The mean blue value of all the pixels within the superpixel may be set as the first node feature. The mean green value of all the pixels within the superpixel may be set as the second node feature. The mean red value of all the pixels within the superpixel may be set as the third node feature. The mean near-infrared value of all the pixels within the superpixel may be set as the fourth node feature.

In some embodiments, superpixel aggregation module 107 may feed the superpixel node input into graph-based aggregation model 210 to generate superpixel aggregation patch 214. Superpixel aggregation patch 214 may include one or more aggregated groups of superpixels, with each aggregated group of superpixels including one or more superpixels from superpixel patch 206. The one or more superpixels in the aggregated group can be aggregated and labelled as a segmented instance (e.g., a parcel).

For example, graph-based aggregation model 210 may be configured to divide the plurality of nodes in superpixel graph 208 into one or more node partitions 212. Each node partition 212 may include one or more nodes from the plurality of nodes, and may correspond to an aggregated group of superpixels. The one or more nodes in the node partition correspond to the one or more superpixels in the aggregated group of superpixels, respectively. Each node partition (or each aggregated group of superpixels) can be labelled as a segmented instance.

By way of examples, assume that superpixel patch 206 of FIG. 2 includes eight superpixels. Then, superpixel graph 208 associated with superpixel patch 206 also includes eight nodes (from node 1 to node 8 as shown in FIG. 2). The eight nodes correspond to the eight superpixels, respectively. Superpixel aggregation module 107 may apply graph-based aggregation model 210 to process superpixel graph 208, so that the eight nodes of superpixel graph 208 may be divided into four node partitions (from partition 1 to partition 4 as shown in FIG. 2). For example, partition 1 may be an aggregation of nodes 1, 7, and 8 of superpixel graph 208 and correspond to a first aggregated group of superpixels. Partition 2 may be an aggregation of nodes 2 and 3 of superpixel graph 208 and correspond to a second aggregated group of superpixels. Partition 3 may be an aggregation of nodes 5 and 6 of superpixel graph 208 and correspond to a third aggregated group of superpixels. Partition 4 may include node 4 of superpixel graph 208 and correspond to a fourth aggregated group of superpixels. Each of partitions 1 to 4 may be labelled as a corresponding segmented instance such as a corresponding parcel in remote sensing image 202.

By performing operations like those described above, superpixel aggregation module 107 may generate one or more superpixel aggregation patches 214 for one or more image patches 204, respectively. Combination module 108 may combine one or more superpixel aggregation patches 214 to generate instance segmentation image 218. For example, all image patches 204 of remote sensing image 202 may be processed by superpixel aggregation module 107 to generate superpixel aggregation patches 214, respectively. Then, superpixel aggregation patches 214 may be fed into combination module 106 and stitched back together to create instance segmentation image 218. Instance segmentation image 218 may have the same size as remote sensing image 202. For example, instance segmentation image 218 may have the same height and the same width as remote sensing image 202.

Since image patches 204 of remote sensing image 202 are processed individually to generate individual superpixel aggregation patches 214, artificial borders may be present on edges of superpixel aggregation patches 214, leading to fake segmentation boundaries between adjacent superpixel aggregation patches 214. This effect of fake segmentation boundaries is illustrated in FIG. 2 using vertical thick lines 230 (artifacts 230) and horizontal thick lines 232 (artifacts 232). Combination module 108 may perform a procedure of artificial border removal 216 to appropriately eliminate these artifacts. Then, combination module 108 may merge similar superpixel aggregation patches 214 having a shared patch border. This merging can be performed across adjacent superpixel aggregation patches 214.

In some embodiments, the similar superpixel aggregation patches 214 with the shared patch border may include one or more identical segmented instances on the shared patch border. In some embodiments, the similar superpixel aggregation patches 214 with the shared patch border may be superpixel aggregation patches 214 having a merging cost smaller than a pre-defined threshold.

For example, a full lambda schedule algorithm can be utilized to calculate a merging cost of two superpixel aggregation patches $S_i$ and $S_j$, which can be expressed using the following equation:

$$C(S_i, S_j) = \frac{\frac{a_i \cdot a_j}{a_i + a_j} d^2_{S_i S_j}}{len(\partial(S_i, S_j))} < \lambda. \tag{1}$$

In the above equation (1), $a_i$ denotes an area of $S_i$ (i.e. the number of pixels within $S_i$), $a_j$ denotes an area of $S_j$ (i.e. the number of pixels within $S_j$), $d_{S_i S_j}$ denotes a spectral Euclidean distance between $S_i$ and $S_j$, len $(a(S_i, S_j))$ refers to a length of a shared border between $S_i$ and $S_j$, and $\lambda$ denotes a pre-defined threshold for the merging cost. If the merging cost $C(S_i, S_j)$ is less than the pre-defined threshold $\lambda$, $S_i$ and $S_j$ are merged and their shared border is removed. If $S_i$ and $S_j$ have a large shared border (e.g., len $(a(S_i, S_j))$ having a large value) or a small Euclidean distance value (e.g., $d_{S_i S_j}$ having a small value), $S_i$ and $S_j$ may have a higher chance to be merged. To facilitate this merging process, superpixel aggregation patches 214 may be first merged horizontally to remove vertical artificial borders (e.g., artifacts 230), and then a vertical merging may be performed to remove horizontal artificial borders (e.g., artifacts 232).

Consistent with the present disclosure, graph-based aggregation model 210 may be trained by training module 109 before being applied to generate superpixel aggregation patches 214. In some embodiments, training module 109 may be configured to generate training data based on remote sensing images retrieved from data source 118. For example, by performing operations like those described above, a remote sensing image retrieved from data source 118 may be processed to generate a plurality of image patches 204, which can then be processed to generate a plurality of superpixel patches 206, respectively. The training data may include the plurality of image patches 204 and the plurality of superpixel patches 206. Ground truth information (or ground truth annotations) may not be needed in the training because graph-based aggregation model 210 is an unsupervised learning-based model.

Training module 109 may train graph-based aggregation model 210 using the training data and determine a loss function thereof. The loss function is described below in more detail with reference to FIGS. 3-4. Training module 106 may update or adjust graph-based aggregation model 210 (e.g., a structure and/or parameters of the model) based on the loss function. A stochastic gradient descent (SGD) approach or any other optimization method can be used to train graph-based aggregation model 210.

Figure 3:
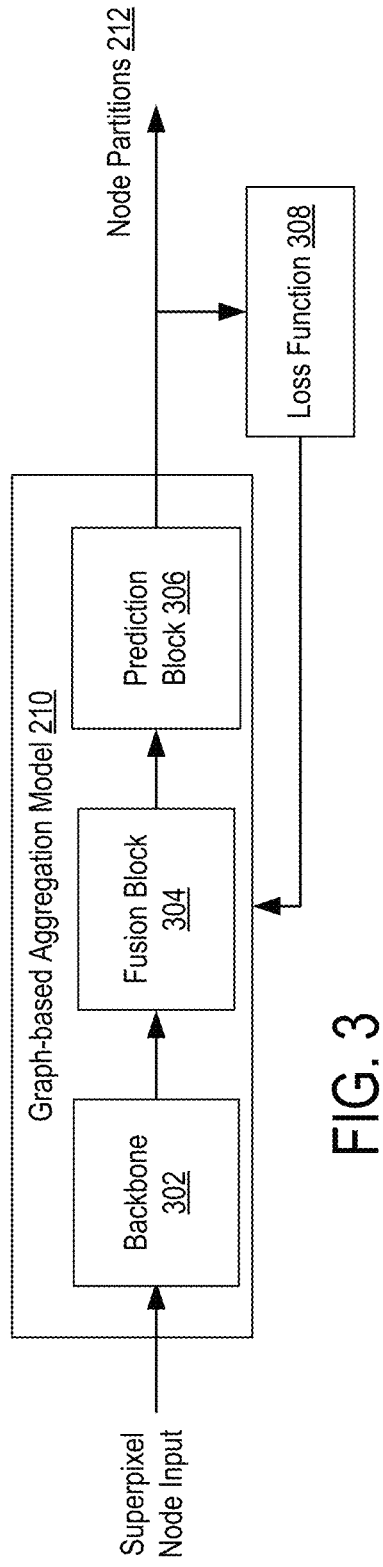
FIG. 3 illustrates a schematic diagram of a graph-based aggregation model, according to embodiments of the disclosure.
Figure 4:
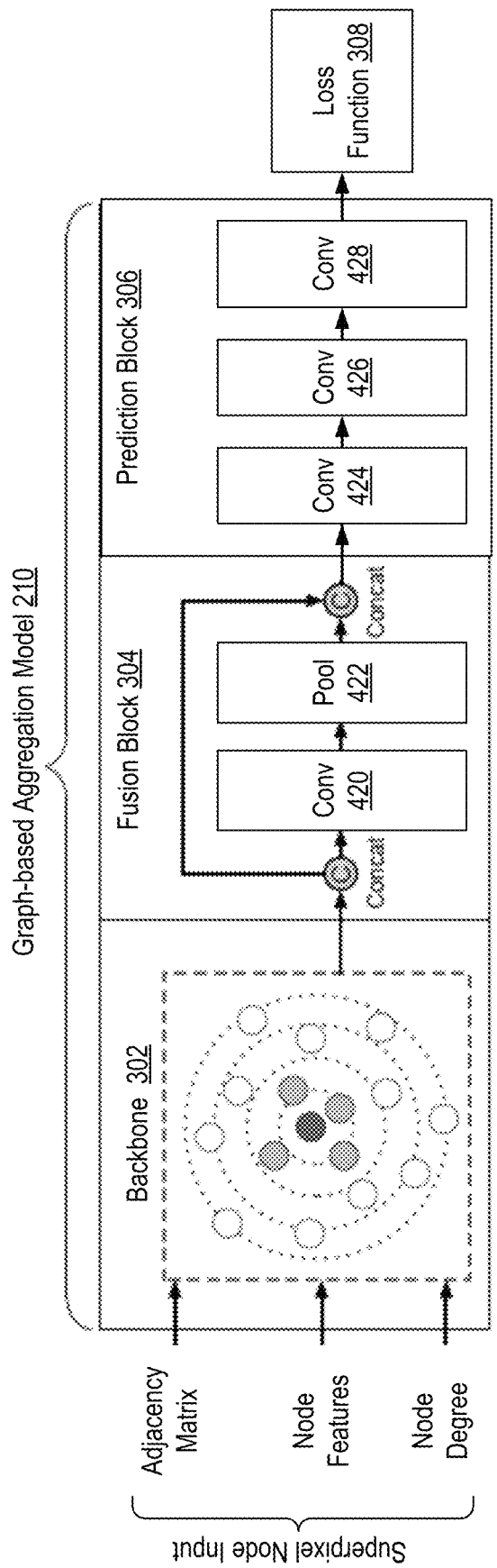
FIG. 4 is a graphical representation illustrating an exemplary detailed structure of the graph-based aggregation model of FIG. 3, according to embodiments of the disclosure.

FIG. 3 illustrates a schematic diagram of a graph-based aggregation model (e.g., graph-based aggregation model 210), according to embodiments of the disclosure. FIG. 4 is a graphical representation illustrating an exemplary detailed structure of graph-based aggregation model 210 of FIG. 3, according to embodiments of the disclosure. FIGS. 3 and 4 are described together herein.

Before describing graph-based aggregation model 210 in more detail, a brief description for the GAP model is presented here for comparison purpose only. The GAP model is proposed to partition a graph in an unsupervised manner, which has two separate modules for graph embedding and partitioning, respectively. However, the GAP model is not suitable for superpixel graph partitioning due to the following issues.

Firstly, the GCN in the graph embedding module of the GAP model suffers from the vanishing gradient problem, limiting itself to shallow models. Another limitation is that the graph edges in the GCN are fixed so that the relationship of a superpixel node and its neighbors are not dynamically learned during training. Secondly, the graph partitioning module of the GAP model includes fully connected layers, which is not the ideal structure to maintain spatial information when reducing the length of channels. Thirdly, spatial and spectral affinities are not learned and applied in the GAP model.

On the other hand, graph-based aggregation model 210 disclosed herein is different from the GAP model in various aspects. For example, comparing with the GAP model, graph-based aggregation model 210 may have a different architecture, a different adjacency matrix, a different loss function, etc. Graph-based aggregation model 210 is designed to effectively consider the specificity of a superpixel graph.

In some embodiments, a superpixel node input may be fed into graph-based aggregation model 210 to generate one or more node partitions 212 corresponding to a superpixel graph (e.g., superpixel graph 208). The superpixel graph may include n nodes that are partitioned into g node partitions by graph-based aggregation model 210, where n and g are positive integers with g≤n. In some embodiments, the g node partitions correspond to g aggregated groups of superpixels in superpixel aggregation patch 214. g denotes a partition parameter and represents a total number of node partitions 212 (or a total number of the aggregated groups of superpixels) in superpixel aggregation patch 214.

The superpixel node input may include an adjacency matrix, multi-dimensional node features of each node, and a node degree of superpixel graph 208. The node degree of superpixel graph 208 may be expressed using a vector such as n×1. For each node, multi-dimensional node features of the node can be determined based on multi-spectral values (e.g., c=4) of pixels in a superpixel corresponding to the node as described above. The multi-dimensional node features of the node may have the same dimension (e.g., 1×c) as the c spectral channels. As a result, a plurality of multi-dimensional node features for the plurality of nodes can be expressed using a matrix with a size of n×c.

In some embodiments, superpixel aggregation module 107 may construct the adjacency matrix to incorporate a spatial affinity and a feature affinity of the plurality of nodes (or equivalently, a spatial affinity and a feature affinity of the plurality of superpixels corresponding to the plurality of nodes). The adjacency matrix may be a weighted adjacency matrix. The feature space may include a spectral space, and the feature affinity may include a spectral affinity of the plurality of nodes (or equivalently, a spectral affinity of the plurality of superpixels).

Specifically, for each element in the adjacency matrix, superpixel aggregation module 107 may determine a spatial adjacency factor for the element with respect to the spatial space and a feature similarity factor for the element with respect to the feature space. Superpixel aggregation module 107 may determine a value for the element based on the spatial adjacency factor, the feature similarity factor, and an adjacency adjustment parameter. In some embodiments, the adjacency adjustment parameter may be configured to adjust a balance of the spatial affinity and the feature affinity of the plurality of nodes.

For example, $A^W = (A_{ij}^W)_{n \times n}$ represents the weighted adjacency matrix. A matrix element $A_{ij}^w$ may be expressed using the following equation:

$$A_{ij}^w = \delta c_{ij} + (1-\delta)e^{-\beta d_{ij}}. \qquad (2)$$

In the above equation (2), $c_{ij}$ represents a spatial adjacency factor (e.g., a spatial distance between the two nodes i and j), with $c_{ij}=1$ if the nodes i and j are spatially adjacent, and otherwise $c_{ij}=0$. $e^{-\beta d_{ij}}$ represents a feature similarity factor (e.g., a weighted similarity in the spectral space), $d_{ij}$ denotes a distance between the two nodes i and j in the feature space (e.g., the Euclidean distance between the average BGRN spectral values of the two nodes i and j), β denotes a weight to control the significance of $d_{ij}$, and δε[0,1] denotes the adjacency adjustment parameter (e.g., a hyper-parameter to adjust the balance of spatial and spectral affinities).

In some examples, a spatial affinity between two nodes i and j can be reflected by the spatial adjacency factor $c_{ij}$. Thus, a spatial affinity of the plurality of nodes may be reflected by a set of spatial adjacency factors for the plurality of nodes, including $c_{11}, c_{12}, \ldots, c_{1n}, c_{21}, \ldots, c_{2n}, \ldots, c_{n1}, \ldots,$ and $c_{nn}$. Similarly, a feature affinity between two nodes i and j can be reflected by the feature similarity factor $e^{-\beta d_{ij}}$. Thus, a feature affinity of the plurality of nodes may be reflected by a set of feature similarity factors for the plurality of nodes, including $e^{-\beta d_{11}}, e^{-\beta d_{12}}, \ldots, e^{-\beta d_{1n}}, e^{-\beta d_{21}}, e^{-\beta d_{2n}}, \ldots, e^{-\beta d_{n1}}, \ldots,$ and $e^{-\beta d_{nn}}$. By incorporating the adjacency matrix $A^W = (A_{ij}^W)_{n \times n}$ into graph-based aggregation model 210, the spatial affinity and the feature affinity of the plurality of nodes can be learned and used by graph-based aggregation model 210 for the aggregation of the plurality of superpixels.

Graph-based aggregation model 210 may be a deep graph convolutional network (DeepGCN). In some embodiments, graph-based aggregation model 210 may include a backbone 302, a fusion block 304, and a prediction block 306.

Backbone 302 may be configured to generate global features and local features associated with the plurality of nodes based on the superpixel node input. For example, backbone 302 may include a Residual Graph Convolutional Network (ResGCN), which adds residual connections between input and output layers to alleviate the vanishing gradient problem. By using a Dilated K-nearest neighbors (KNN) function, graph-based aggregation model 210 (e.g., DeepGCN) can dynamically change neighbors in the GCN to mitigate the over-smoothing issue and learn better graph representations. This is an advantage over the GCN in which only vertex features are updated at each iteration.

Fusion block 304 may be configured to fuse the global features and the local features from backbone 302 to generate fused features. For example, fusion block 304 may fuse the global features as well as local features from the ResGCN backbone. Fusion block 304 may include a convolutional layer 420 and a pooling layer 422 that are connected in series. Convolutional layer 420 may be a 1×1 convolutional layer with 1024 filters. Pooling layer 422 may be a global max pooling layer.

For example, an output from backbone 302 (e.g., the global features and the local features from backbone 302) may be concatenated to generate a fusion block input. The fusion block input may be processed by convolutional layer 420 and pooling layer 422 to generate a fusion intermediate result. Then, the fusion intermediate result may be concatenated with the fusion block input to generate fused features as an output of fusion block 304.

Prediction block 306 may be configured to assign the plurality of nodes (e.g., n nodes) to g node partitions based on the fused features from fusion block 304. Specifically, prediction block 306 may include a plurality of convolution layers to maintain the spatial information and assign the n nodes to the g node partitions. For example, prediction block 306 may include a first 1×1 convolutional layer 424 with 512 filters, a second 1×1 convolutional layer 426 with 256 filters, and a third 1×1 convolutional layer 428 with g filters. Consequently, the graph partitioning module of the GAP model is not needed in prediction block 306 disclosed herein, since the DeepGCN is regarded as an improved holistic combination of the graph embedding and partitioning modules of the GAP model. An output of prediction block 306 may be an n×g matrix, indicating every superpixel's partition class. Visually, adjacent superpixels with the same partition label appear aggregated together (e.g., as shown in superpixel aggregation patch 214 of FIG. 2).

In some embodiments, the partition parameter g may be determined using a machine learning-based detection method. For example, an edge detection method may be applied to determine a value of the partition parameter g. Specifically, an edge response can be determined using the edge detection method. A more obvious boundary in an image may lead to a larger edge response. The partition parameter g may be determined based on the edge response. Exemplary edge detection methods may include, but are not limited to, the following: a Sobel edge detector, a Prewitt edge detector, a Laplacian edge detector, a Canny edge detector, etc. In some applications, the partition parameter g may be equal to 140 for plain plots.

During a training process of graph-based aggregation model 210, the output of prediction block 306 may also be used to calculate a loss function 308. In some embodiments, loss function 308 may include a normalized cut loss and a balanced cut loss, where the balanced cut loss is weighted by a loss adjustment parameter. For example, loss function 308 may be expressed using the following equation:

$$L = L_{normalized} + \sigma L_{balanced\_cut}. \quad (3)$$

In the above equation (3), L denotes a value of loss function 308, $L_{normalized}$ denotes the normalized cut loss, $L_{balanced\_cut}$ denotes the balanced cut loss, and $\sigma$ denotes the loss adjustment parameter. The loss adjustment parameter $\sigma$ may be used to adjust a degree of importance of the balanced cut loss in loss function 308. For example, when $\sigma$=0, the balanced cut loss is not included in loss function 308. A greater value of $\sigma$ indicates a higher importance of the balanced cut loss in loss function 308.

In some examples, the normalized cut loss $L_{normalized}$ and the balanced cut loss $L_{balanced\_cut}$ may be expressed using the following equations, respectively:

$$L_{normalized} = \Sigma_{reduce-sum}(Y \oslash \Gamma)(1-Y)^T \odot A^W, \text{ and} \quad (4)$$

$$L_{balanced\_cut} = \sum_{k=1}^{g}\left(\sum_{i=1}^{n} Y_{ik} - \frac{n}{g}\right)^2 = \Sigma_{reduce-sum}\left(1^T Y - \frac{n}{g}\right)^2. \quad (5)$$

In the above equations (4) and (5), $Y \in R^{n \times g}$, where $Y_{ik}$ represents a probability that a node i belongs to a partition k, with $1 \le i \le n$ and $1 < k \le g$. $\Gamma = Y^T D$, where D denotes a column vector with a size of n with an ith element Di denoting the degree of the node i. $\oslash$ denotes element-wise division, and $\odot$ denotes element-wise product.

Figure 5:
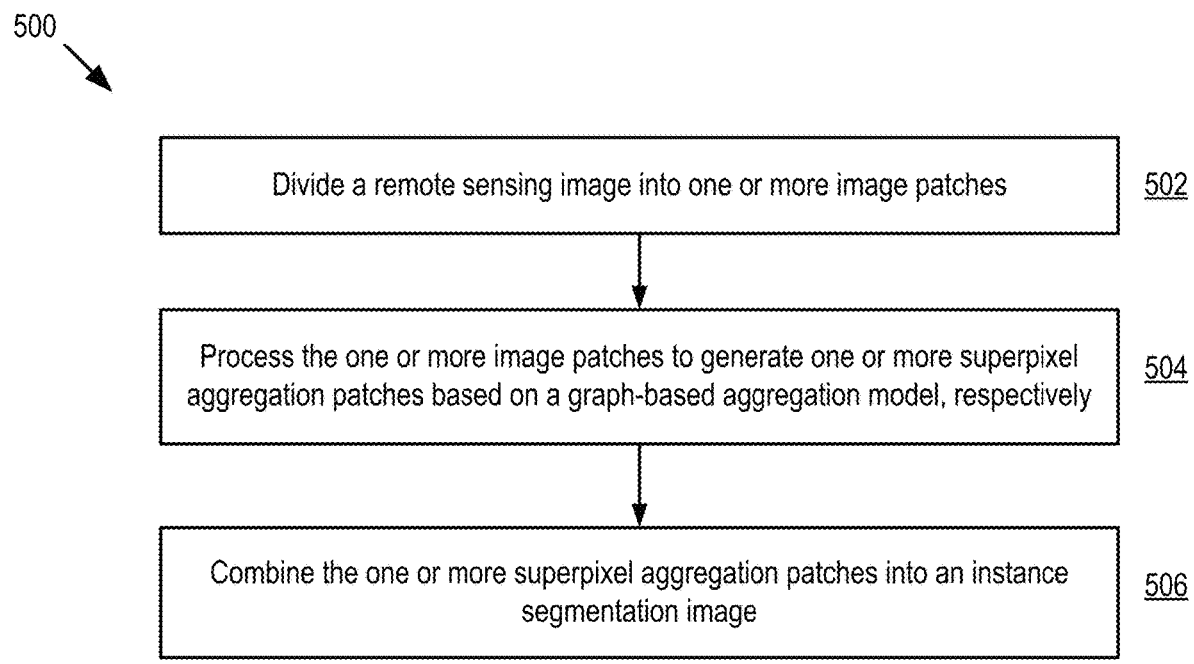
FIG. 5 is a flowchart of an exemplary method for performing unsupervised superpixel-driven instance segmentation on a remote sensing image, according to embodiments of the disclosure.

FIG. 5 is a flowchart of an exemplary method 500 for performing unsupervised superpixel-driven instance segmentation on a remote sensing image, according to embodiments of the disclosure. Method 500 may be implemented by system 101, specifically cropping module 105, superpixel generation module 106, superpixel aggregation module 107, and combination module 108, and may include steps 502-506 as described below. Some of the steps may be optional to perform the disclosure provided herein. Further, some of the steps may be performed simultaneously, or in a different order than that shown in FIG. 5.

At step 502, a remote sensing image may be divided into one or more image patches. For example, cropping module 105 may crop a remote sensing image 202 into one or more image patches 204.

At step 504, the one or more image patches may be processed to generate one or more superpixel aggregation patches based on a graph-based aggregation model, respectively. For example, superpixel generation module 106 may generate one or more superpixel patches 206 based on one or more image patches 204, respectively. Then, superpixel aggregation module 107 may apply graph-based aggregation model 210 to generate one or more superpixel aggregation patches 214 based on one or more superpixel patches 206 and one or more image patches 204, respectively.

For example, for each image patch 204, a corresponding superpixel aggregation patch 214 may be generated using graph-based aggregation model 210 by performing operations like those described below with reference to FIG. 6.

At step 506, the one or more superpixel aggregation patches may be combined into an instance segmentation image. For example, combination module 108 may combine one or more superpixel aggregation patches 214 into an instance segmentation image 218.

Figure 6:
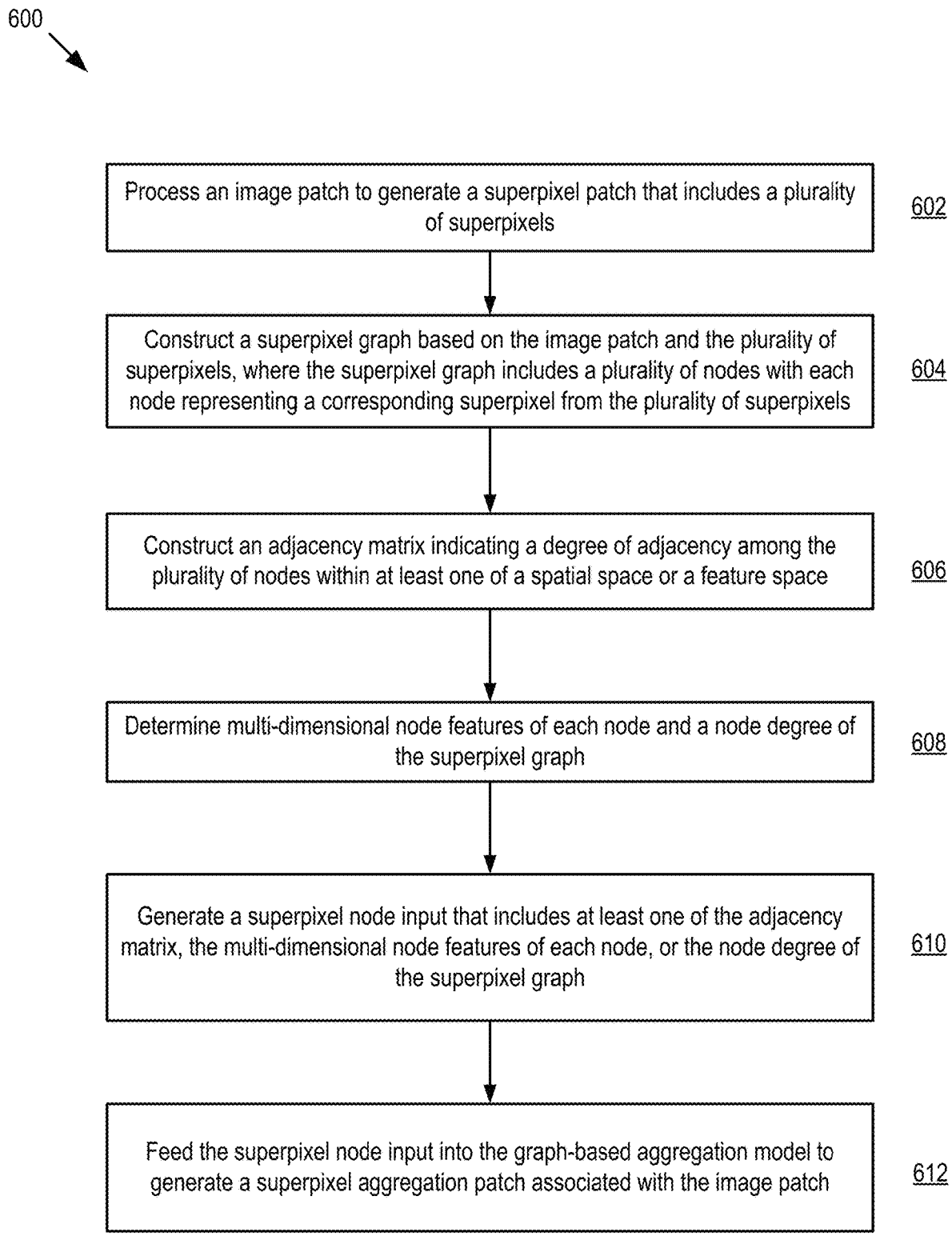
FIG. 6 is a flowchart of an exemplary method for generating a superpixel aggregation patch from an image patch, according to embodiments of the disclosure.

FIG. 6 is a flowchart of an exemplary method 600 for generating a superpixel aggregation patch from an image patch, according to embodiments of the disclosure. Method 600 may be implemented by system 101, specifically superpixel generation module 106 and superpixel aggregation module 107, and may include steps 602-612 as described below. In some embodiments, method 600 may be performed to implement step 504 in FIG. 5. Some of the steps may be optional to perform the disclosure provided herein. Further, some of the steps may be performed simultaneously, or in a different order than that shown in FIG. 6.

At step 602, superpixel generation module 106 may process an image patch to generate a superpixel patch that includes a plurality of superpixels.

At step 604, superpixel aggregation module 107 may construct a superpixel graph based on the image patch and the plurality of superpixels. The superpixel graph includes a plurality of nodes, with each node representing a corresponding superpixel from the plurality of superpixels.

At step 606, superpixel aggregation module 107 may construct an adjacency matrix indicating a degree of adjacency among the plurality of nodes within at least one of a spatial space or a feature space.

At step 608, superpixel aggregation module 107 may determine multi-dimensional node features of each node and a node degree of the superpixel graph.

At step 610, superpixel aggregation module 107 may generate a superpixel node input that includes at least one of the adjacency matrix, the multi-dimensional node features of each node, or the node degree of the superpixel graph.

At step 612, superpixel aggregation module 107 may feed the superpixel node input into graph-based aggregation model 210 to generate a superpixel aggregation patch associated with the image patch.

Figure 7:
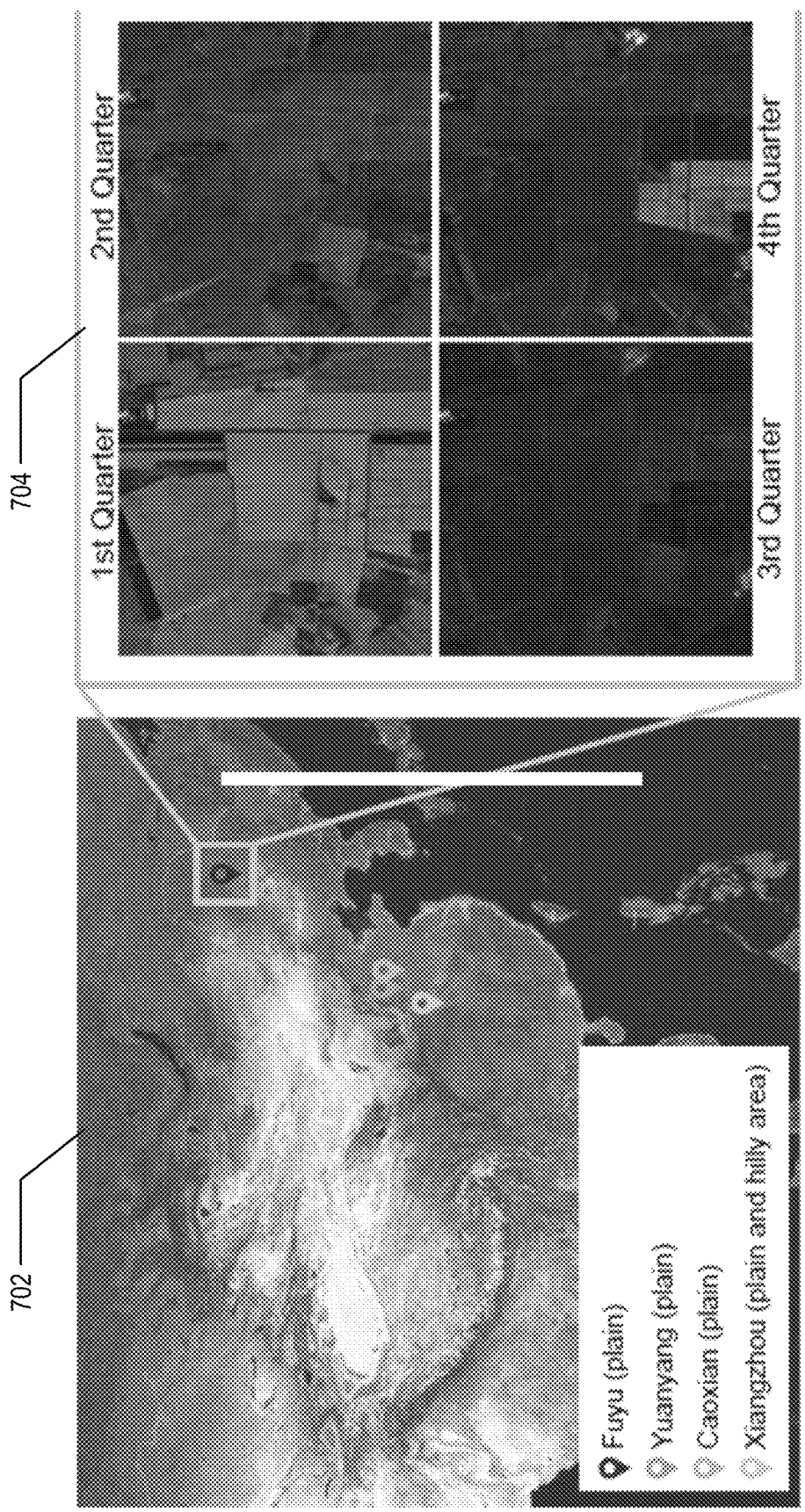
FIG. 7 is a graphical representation illustrating locations and terrain types in an exemplary testing dataset, according to embodiments of the disclosure.

FIG. 7 is a graphical representation illustrating locations and terrain types in an exemplary testing dataset, according to embodiments of the disclosure. The testing dataset is built using Sentinel-2 images over four county regions which have parcel-level ground truth labels. The four county regions are in areas of major grain production in China and cover a total area of about 4600 $km^2$, including Fuyu, Yuanyang, Caoxian, and Xiangzhou, which are shown in an image 702 of FIG. 7. Since the ground truth reference was annotated in 2019, only valid images in 2019 from Sentinel-2 data is acquired and declouded to exclude defective/corrupted images that have dense clouds. An example of an image patch with land cover variations at Fuyu county throughout four quarters (representing four seasons) is illustrated in an image 704 of FIG. 7.

A Probabilistic Rand Index (PRI) value can be adopted as a segmentation evaluation metric, which quantifies a partition similarity between a segmentation result and the ground truth. For example, the partition similarity can be a partition similarity between a partition result of a superpixel aggregation patch and the ground truth of an image patch corresponding to the superpixel aggregation patch. The PRI value (or, the partition similarity) may have a value ranging from 0 to 1. A higher PRI value indicates a better segmentation result.

An average PRI value over multi-temporal images can be calculated to evaluate the performance of graph-based aggregation model 210. A Simple Non-Iterative Clustering (SNIC) implementation is modified to support a 4-channel image patch input (e.g., c=4), and the image patch size is set to be 512×512. 28 GCN layers are adopted in backbone 302 of graph-based aggregation model 210. The maximum number of neighbors of a node is set to be 8. The weight β for the spectral Euclidean distance is assigned to be 30. The learning rate, the dropout rate, and the decay rate are set to be 0.001, 0.3, and 0.5, respectively. The pre-defined threshold λ for the merging cost is set to be 30,000.

Figure 8:
FIG. 8 is a graphical representation illustrating an exemplary performance comparison among various existing models and a graph-based aggregation model described herein, according to embodiments of the disclosure.
Figure 8:

FIG. 8 is a graphical representation illustrating an exemplary performance comparison among various existing models and a graph-based aggregation model described herein, according to embodiments of the disclosure. Several existing models including the DIC model, the UISB model, and the GAP model are used in the performance comparison. For ease of comparison, every model uses the same superpixel generation input and the same number of node partitions g.

Referring to FIG. 9A, Table 1 lists average PRI values of parcel segmentation results on the testing dataset of FIG. 7 using the three existing models (DIC, UISB, GAP) and graph-based aggregation model 210. It is noted that graph-based models have better performance, and graph-based aggregation model 210 disclosed herein achieves the best performance compared with the other models across all county regions. For each county, Fuyu has the highest PRI values due to its simpler parcel layout and lower urban density. On the contrary, the hilly topography in Xiangzhou indeed has impacts on the segmentation results of all four models due to the more irregular parcel shapes and distribution. Yuanyang and Caoxian counties are located close to each other, and their terrains and parcel layouts are comparable, leading to similar PRI results.

Referring back to FIG. 8 again, visualized results of an image patch example in Yuanyang county are illustrated. Particularly, both DIC and UISB maintain the boundaries between urban and cropland areas; however, DIC undergoes the effect of rapid convergence to over-aggregate cropland parcels, and UISB have lots of tiny segments. Since the spatial affinity among superpixels is not learned well in the existing models, the cropland parcel boundaries are obviously ignored in the segmentation results of the existing models. Further, GAP obtains clearer parcel boundaries but is unable to separate the croplands from the urban areas well. Many incorrect parcel segments can be found at the actual urban boundaries.

Graph-based aggregation model 210 disclosed herein achieves better parcel segmentation results as well as the clear boundaries of urban and cropland areas. There are various reasons each of which may lead to the better performance of graph-based aggregation model 210. For example, graph-based aggregation model 210 learns the graph embedding better than the conventional GCN by mitigating the gradient vanishing problem. In another example, the fully connected layers inside GAP fail to preserve spatial information of superpixels, whereas graph-based aggregation model 210 disclosed herein can incorporate the spatial information of the superpixels into the model. In yet another example, the adjacency matrix inputted to graph-based aggregation model 210 is improved to consider affinities of the superpixels in both spatial and feature spaces. As a result, graph-based aggregation model 210 may aggregate the superpixels based on at least one of the spatial affinity or the feature affinity of the superpixels to achieve a better segmentation result.

FIG. 9B is a graphical representation illustrating average PRI values of graph-based aggregation model 210 with various combinations of parameter values, according to embodiments of the disclosure. For example, an analysis of the adjacency adjustment parameter δ and the loss adjustment parameter σ in the equations (2) and (3) are provided herein with reference to FIG. 9B.

For efficient ablation experiments, a representative county Yuanyang is used because it has a relatively balanced percentage of urban and agricultural areas, and the model performance in this county is intermediate. Different orders of magnitude for σ are set, and intervals for δ are created. Table 2 of FIG. 9B shows the average PRI values of graph-based aggregation model 210 for different values of the adjacency adjustment parameter δ and the loss adjustment parameter σ.

In Table 2, the best result is achieved when the loss adjustment parameter σ and the adjacency adjustment parameter δ are 1 and 0.7, respectively. The settings of σ and δ indicate that: (i) the normalized cut loss and the balanced cut loss in the loss function synergistically contribute to the learning process; (ii) a significant decrease on the dominance of the balance cut loss ($\sigma$=0.1) degrades the performance; (iii) in an adjacency matrix, similarity in the spectral space is valuable and even more dominant, but the spatial superpixel adjacency is not ignored; (iv) a pure reliance on similarity in either the spectral space ($\delta$=0) or spatial space ($\delta$=1) only (not both) may lead to a sub-optimal result.

FIG. 9C is a graphical representation illustrating overall robustness of graph-based aggregation model 210 across different seasons, according to embodiments of the disclosure. As shown in image 704 of FIG. 7, image patches in the same region can vary greatly in different quarters due to environmental change and plant growth. The performance of graph-based aggregation model 210 is evaluated in four individual quarters/seasons using the testing dataset.

The PRI values in Table 3 of FIG. 9C demonstrate the overall robustness of graph-based aggregation model 210 across the different quarters/seasons. The performance is most stable in Fuyu but fluctuates in Xiangzhou. A reason for this scenario can be related to the topographic simplicity and low urbanization in Fuyu. Another observation is that Fuyu has relatively better performance in cold seasons, Yuanyang and Caoxian have outstanding segmentation results in the first half-year, and Xiangzhou achieves the best PRI values in the third quarter. These differences are potentially caused by intra-annual climate and vegetation variability.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, a method for unsupervised superpixel-driven instance segmentation of a remote sensing image is disclosed. The remote sensing image is divided into one or more image patches. The one or more image patches are processed to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The one or more superpixel aggregation patches are combined into an instance segmentation image.

In some embodiments, processing the one or more image patches to generate the one or more superpixel aggregation patches, respectively, includes: for each image patch from the one or more image patches, processing the image patch to generate a corresponding superpixel patch that includes the plurality of superpixels; and applying the graph-based aggregation model to the image patch and the plurality of superpixels to generate a corresponding superpixel aggregation patch associated with the image patch.

In some embodiments, applying the graph-based aggregation model to the image patch and the plurality of superpixels to generate the corresponding superpixel aggregation patch includes: constructing a superpixel graph based on the image patch and the plurality of superpixels, where the superpixel graph includes a plurality of nodes, with each node representing a corresponding superpixel from the plurality of superpixels; constructing an adjacency matrix indicating a degree of adjacency among the plurality of nodes within at least one of a spatial space or a feature space; and feeding a superpixel node input into the graph-based aggregation model to generate the corresponding superpixel aggregation patch, where the superpixel node input includes the adjacency matrix.

In some embodiments, the superpixel node input further includes multi-dimensional node features of each node and a node degree of the superpixel graph.

In some embodiments, the multi-dimensional node features of each node are determined based on multi-spectral values of pixels in the corresponding superpixel.

In some embodiments, constructing the adjacency matrix includes: for each element in the adjacency matrix, determining a spatial adjacency factor for the element with respect to the spatial space; determining a feature similarity factor for the element with respect to the feature space; and determining a value for the element based on the spatial adjacency factor, the feature similarity factor, and an adjacency adjustment parameter.

In some embodiments, the adjacency adjustment parameter is configured to adjust a balance of the spatial affinity and the feature affinity of the plurality of superpixels.

In some embodiments, the feature space includes a spectral space, and the feature affinity includes a spectral affinity of the plurality of superpixels.

In some embodiments, the graph-based aggregation model includes: a backbone configured to generate global features and local features associated with the plurality of nodes based on the superpixel node input; a fusion block configured to fuse the global features and the local features to generate fused features; and a prediction block configured to assign the plurality of nodes to g node partitions based on the fused features, with g being a positive integer.

In some embodiments, the g node partitions correspond to g aggregated groups of superpixels in the corresponding superpixel aggregation patch, respectively, and each aggregated group of superpixels include one or more superpixels from the plurality of superpixels, with the one or more superpixels corresponding to one or more nodes in a corresponding node partition.

In some embodiments, g represents a total number of the aggregated groups of superpixels in the corresponding superpixel aggregation patch and is determined using a machine-learning-based detection method.

In some embodiments, a loss function of the graph-based aggregation model includes a normalized cut loss and a balanced cut loss, with the balanced cut loss being weighted by a loss adjustment parameter.

In some embodiments, the loss adjustment parameter is configured to adjust a degree of importance of the balanced cut loss in the loss function.

In some embodiments, each image patch has multi-spectral channels including a red band, a green band, a blue band, and a near-infrared band.

According to another aspect of the present disclosure, a system for unsupervised superpixel-driven instance segmentation of a remote sensing image is disclosed. The system includes a memory configured to store instructions and a processor coupled to the memory. The processor is configured to execute the instructions to perform a process. The process includes dividing the remote sensing image into one or more image patches. The process further includes processing the one or more image patches to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The process also includes combining the one or more superpixel aggregation patches into an instance segmentation image.

In some embodiments, to process the one or more image patches to generate the one or more superpixel aggregation patches, respectively, the processor is configured to perform the process further including: for each image patch from the one or more image patches, processing the image patch to generate a corresponding superpixel patch that includes the plurality of superpixels; and applying the graph-based aggregation model to the image patch and the plurality of superpixels to generate a corresponding superpixel aggregation patch associated with the image patch.

In some embodiments, to apply the graph-based aggregation model to the image patch and the plurality of superpixels to generate the corresponding superpixel aggregation patch, the processor is configured to perform the process further including: constructing a superpixel graph based on the image patch and the plurality of superpixels, where the superpixel graph includes a plurality of nodes, with each node representing a corresponding superpixel from the plurality of superpixels; constructing an adjacency matrix indicating a degree of adjacency among the plurality of nodes within at least one of a spatial space or a feature space; and feeding a superpixel node input into the graph-based aggregation model to generate the corresponding superpixel aggregation patch, where the superpixel node input includes the adjacency matrix.

In some embodiments, the superpixel node input further includes multi-dimensional node features of each node and a node degree of the superpixel graph.

In some embodiments, the processor is configured to perform the process further including: determining the multi-dimensional node features of each node based on multi-spectral values of pixels in the corresponding superpixel.

In some embodiments, to construct the adjacency matrix, the processor is configured to perform the process further including: for each element in the adjacency matrix, determining a spatial adjacency factor for the element with respect to the spatial space; determining a feature similarity factor for the element with respect to the feature space; and determining a value for the element based on the spatial adjacency factor, the feature similarity factor, and an adjacency adjustment parameter.

In some embodiments, the adjacency adjustment parameter is configured to adjust a balance of the spatial affinity and the feature affinity of the plurality of superpixels.

In some embodiments, the feature space includes a spectral space, and the feature affinity includes a spectral affinity of the plurality of superpixels.

In some embodiments, the graph-based aggregation model includes: a backbone configured to generate global features and local features associated with the plurality of nodes based on the superpixel node input; a fusion block configured to fuse the global features and the local features to generate fused features; and a prediction block configured to assign the plurality of nodes to g node partitions based on the fused features, with g being a positive integer.

In some embodiments, the g node partitions correspond to g aggregated groups of superpixels in the corresponding superpixel aggregation patch, respectively, and each aggregated group of superpixels include one or more superpixels from the plurality of superpixels, with the one or more superpixels corresponding to one or more nodes in a corresponding node partition.

In some embodiments, g represents a total number of the aggregated groups of superpixels in the corresponding superpixel aggregation patch and is determined using a machine-learning-based detection method.

In some embodiments, a loss function of the graph-based aggregation model includes a normalized cut loss and a balanced cut loss, with the balanced cut loss being weighted by a loss adjustment parameter.

In some embodiments, the loss adjustment parameter is configured to adjust a degree of importance of the balanced cut loss in the loss function.

In some embodiments, each image patch has multi-spectral channels including a red band, a green band, a blue band, and a near-infrared band.

According to yet another aspect of the present disclosure, a non-transitory computer-readable storage medium is disclosed. The non-transitory computer-readable storage medium is configured to store instructions which, in response to an execution by a processor, cause the processor to perform a process. The process includes dividing the remote sensing image into one or more image patches. The process further includes processing the one or more image patches to generate one or more superpixel aggregation patches based on a graph-based aggregation model, respectively. The graph-based aggregation model is configured to learn at least one of a spatial affinity or a feature affinity of a plurality of superpixels from each image patch and aggregate the plurality of superpixels based on the at least one of the spatial affinity or the feature affinity of the plurality of superpixels. The process also includes combining the one or more superpixel aggregation patches into an instance segmentation image.

The foregoing description of the specific implementations can be readily modified and/or adapted for various applications. Therefore, such adaptations and modifications are intended to be within the meaning and range of equivalents of the disclosed implementations, based on the teaching and guidance presented herein. The breadth and scope of the present disclosure should not be limited by any of the above-described exemplary implementations, but should be defined only in accordance with the following claims and their equivalents.

What is claimed is:

1. A computer-implemented method for unsupervised superpixel-driven instance segmentation of a remote sensing image, comprising:
   dividing, by a processor, the remote sensing image into one or more image patches;
   processing, by the processor, the one or more image patches to generate one or more superpixel aggregation patches based on a graph-based aggregation model, respectively, at least by:
     for each image patch from the one or more image patches,
        processing the image patch to generate a corresponding superpixel patch that comprises a plurality of superpixels;
        constructing a superpixel graph based on the image patch and the plurality of superpixels, wherein the superpixel graph comprises a plurality of nodes, with each node representing a corresponding superpixel from the plurality of superpixels;

determining multi-dimensional node features of each node based on multi-spectral values of pixels in the corresponding superpixel; and feeding a superpixel node input comprising the multi-dimensional node features of each node into the graph-based aggregation model to generate a corresponding superpixel aggregation patch associated with the image patch; and combining, by the processor, the one or more superpixel aggregation patches into an instance segmentation image.

2. The method of claim 1, wherein
the graph-based aggregation model is configured to learn at least one of a spatial affinity or a feature affinity of the plurality of superpixels from each image patch and aggregate the plurality of superpixels based on the at least one of the spatial affinity or the feature affinity of the plurality of superpixels.

3. The method of claim 2, further comprising:
constructing an adjacency matrix indicating a degree of adjacency among the plurality of nodes within at least one of a spatial space or a feature space, wherein the superpixel node input further comprises the adjacency matrix.

4. The method of claim 3, wherein the superpixel node input further comprises a node degree of the superpixel graph.

5. The method of claim 3, wherein constructing the adjacency matrix comprises:
for each element in the adjacency matrix,
determining a spatial adjacency factor for the element with respect to the spatial space;
determining a feature similarity factor for the element with respect to the feature space; and
determining a value for the element based on the spatial adjacency factor, the feature similarity factor, and an adjacency adjustment parameter.

6. The method of claim 5, wherein the adjacency adjustment parameter is configured to adjust a balance of the spatial affinity and the feature affinity of the plurality of superpixels.

7. The method of claim 3, wherein the feature space comprises a spectral space, and
the feature affinity comprises a spectral affinity of the plurality of superpixels.

8. The method of claim 3, wherein the graph-based aggregation model comprises:
a backbone configured to generate global features and local features associated with the plurality of nodes based on the superpixel node input;
a fusion block configured to fuse the global features and the local features to generate fused features; and
a prediction block configured to assign the plurality of nodes to g node partitions based on the fused features, with g being a positive integer.

9. The method of claim 8, wherein the g node partitions correspond to g aggregated groups of superpixels in the corresponding superpixel aggregation patch, respectively, and each aggregated group of superpixels comprise one or more superpixels from the plurality of superpixels, with the one or more superpixels corresponding to one or more nodes in a corresponding node partition.

10. The method of claim 9, wherein g represents a total number of the aggregated groups of superpixels in the corresponding superpixel aggregation patch and is determined using a machine-learning-based detection method.

11. The method of claim 1, wherein a loss function of the graph-based aggregation model comprises a normalized cut loss and a balanced cut loss, with the balanced cut loss being weighted by a loss adjustment parameter.

12. The method of claim 11, wherein the loss adjustment parameter is configured to adjust a degree of importance of the balanced cut loss in the loss function.

13. The method of claim 1, wherein each image patch has multi-spectral channels comprising a red band, a green band, a blue band, and a near-infrared band.

14. A system for unsupervised superpixel-driven instance segmentation of a remote sensing image, comprising:
a memory configured to store instructions; and
a processor coupled to the memory and configured to execute the instructions to perform a process comprising:
dividing the remote sensing image into one or more image patches;
processing the one or more image patches to generate one or more superpixel aggregation patches based on a graph-based aggregation model, respectively, at least by:
for each image patch from the one or more image patches,
processing the image patch to generate a corresponding superpixel patch that comprises a plurality of superpixels;
constructing a superpixel graph based on the image patch and the plurality of superpixels, wherein the superpixel graph comprises a plurality of nodes, with each node representing a corresponding superpixel from the plurality of superpixels;
determining multi-dimensional node features of each node based on multi-spectral values of pixels in the corresponding superpixel; and
feeding a superpixel node input comprising the multi-dimensional node features of each node into the graph-based aggregation model to generate a corresponding superpixel aggregation patch associated with the image patch; and
combining the one or more superpixel aggregation patches into an instance segmentation image.

15. The system of claim 14, wherein
the graph-based aggregation model is configured to learn at least one of a spatial affinity or a feature affinity of the plurality of superpixels from each image patch and aggregate the plurality of superpixels based on the at least one of the spatial affinity or the feature affinity of the plurality of superpixels.

16. The system of claim 15, wherein the processor is configured to perform the process further comprising:
constructing an adjacency matrix indicating a degree of adjacency among the plurality of nodes within at least one of a spatial space or a feature space;
wherein the superpixel node input further comprises the adjacency matrix.

17. The system of claim 16, wherein the superpixel node input further comprises a node degree of the superpixel graph.

18. A non-transitory computer-readable storage medium configured to store instructions which, in response to an execution by a processor, cause the processor to perform a process comprising:
dividing a remote sensing image into one or more image patches;

processing the one or more image patches to generate one or more superpixel aggregation patches based on a graph-based aggregation model, respectively, at least by:

for each image patch from the one or more image patches,
processing the image patch to generate a corresponding superpixel patch that comprises a plurality of superpixels;
constructing a superpixel graph based on the image patch and the plurality of superpixels, wherein the superpixel graph comprises a plurality of nodes, with each node representing a corresponding superpixel from the plurality of superpixels;
determining multi-dimensional node features of each node based on multi-spectral values of pixels in the corresponding superpixel; and
feeding a superpixel node input comprising the multi-dimensional node features of each node into the graph-based aggregation model to generate a corresponding superpixel aggregation patch associated with the image patch; and
combining the one or more superpixel aggregation patches into an instance segmentation image.

19. The system of claim 16, wherein to construct the adjacency matrix, the processor is configured to perform the process further comprising:

for each element in the adjacency matrix,
determining a spatial adjacency factor for the element with respect to the spatial space;
determining a feature similarity factor for the element with respect to the feature space; and
determining a value for the element based on the spatial adjacency factor, the feature similarity factor, and an adjacency adjustment parameter.

20. The system of claim 19, wherein the adjacency adjustment parameter is configured to adjust a balance of the spatial affinity and the feature affinity of the plurality of superpixels.

* * * * *